Jan. 23, 1951 — E. F. BRITTEN, JR — 2,538,896
MULTIPLIER MAGAZINE
Original Filed July 13, 1945 — 11 Sheets—Sheet 1

Inventor
Edwin F. Britten Jr.
By Stuart Wilder
Attorney

Jan. 23, 1951     E. F. BRITTEN, JR     2,538,896
MULTIPLIER MAGAZINE

Original Filed July 13, 1945     11 Sheets-Sheet 2

INVENTOR.
Edwin F. Britten, Jr.
BY
ATTORNEY

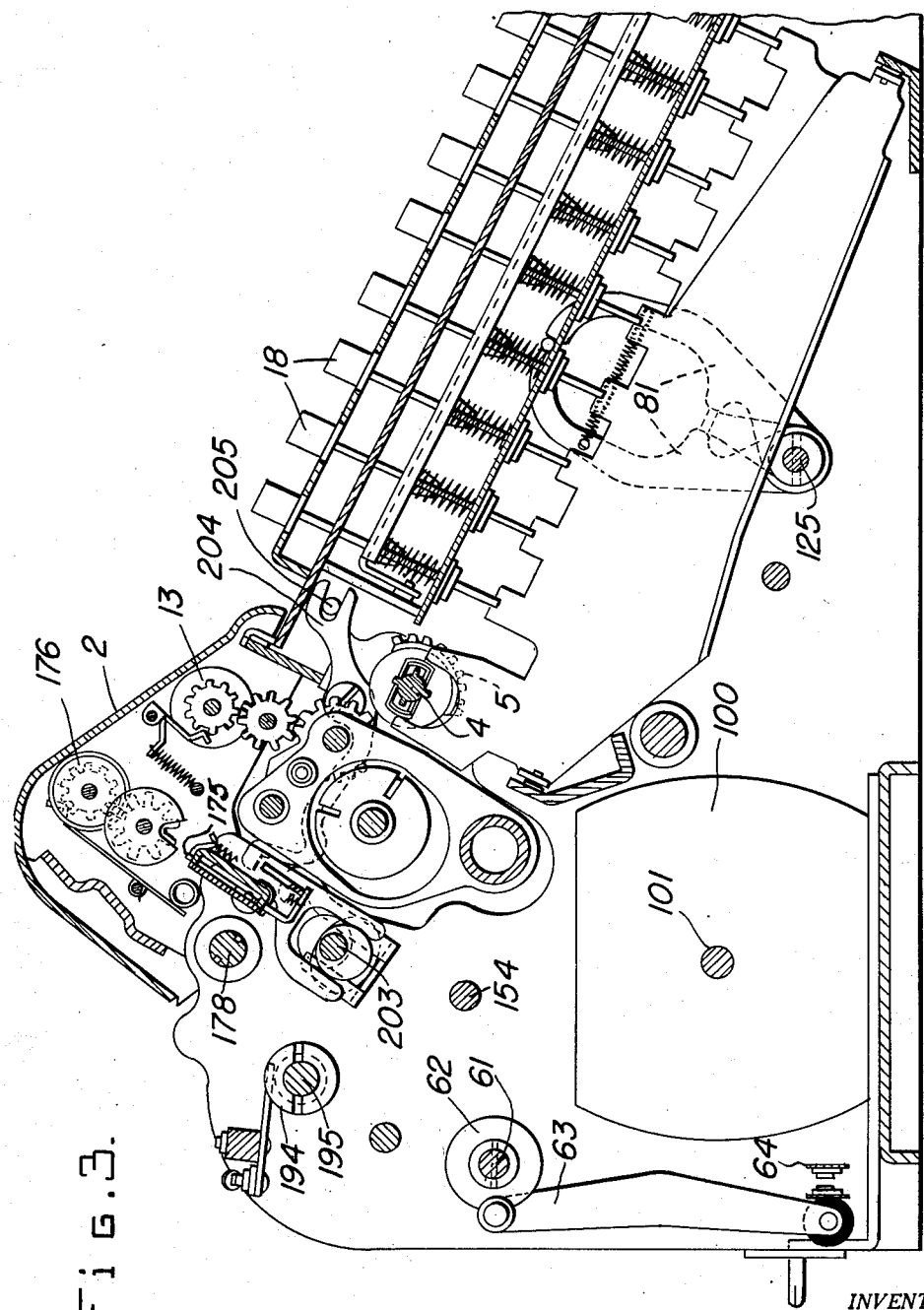

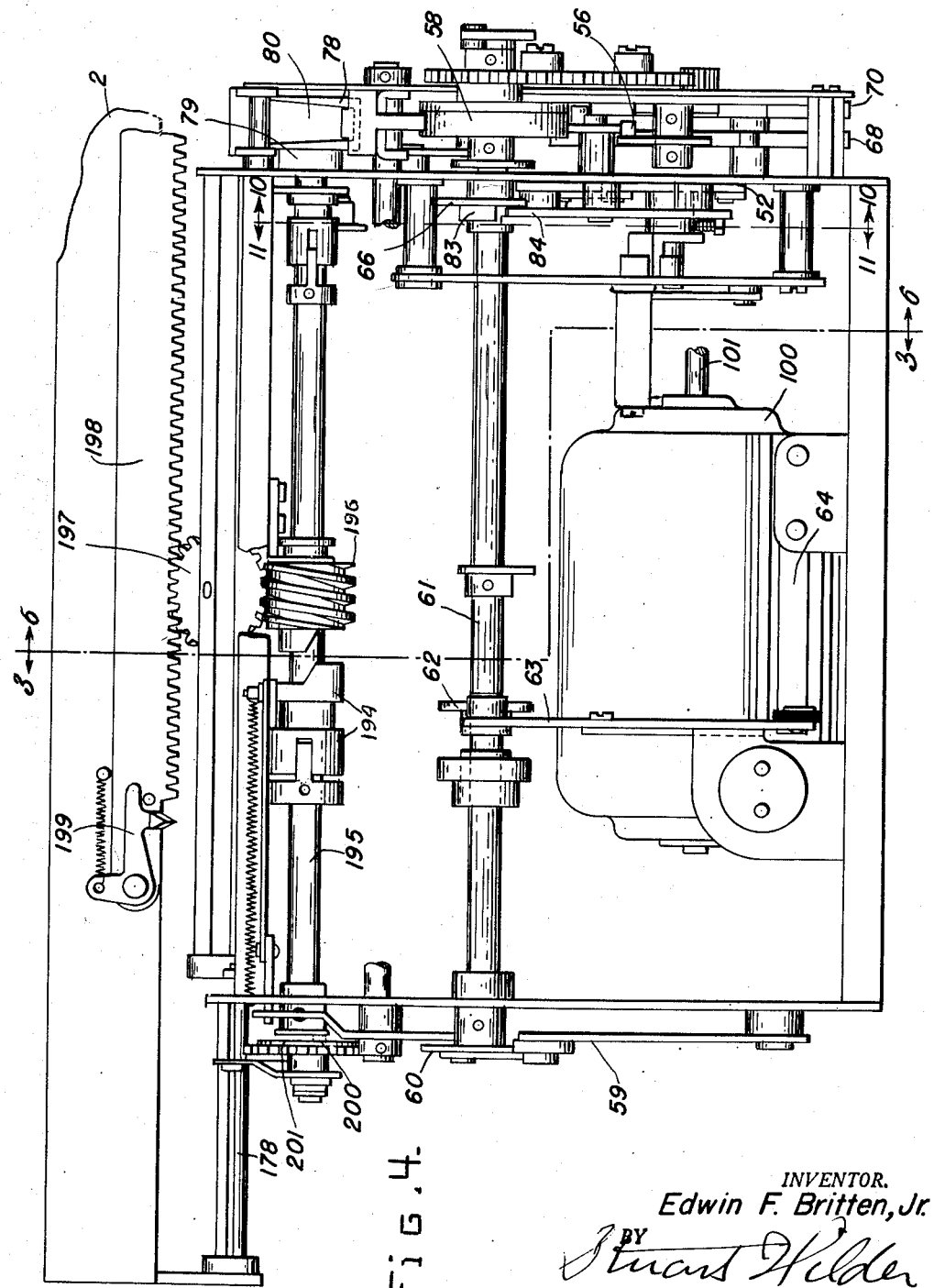

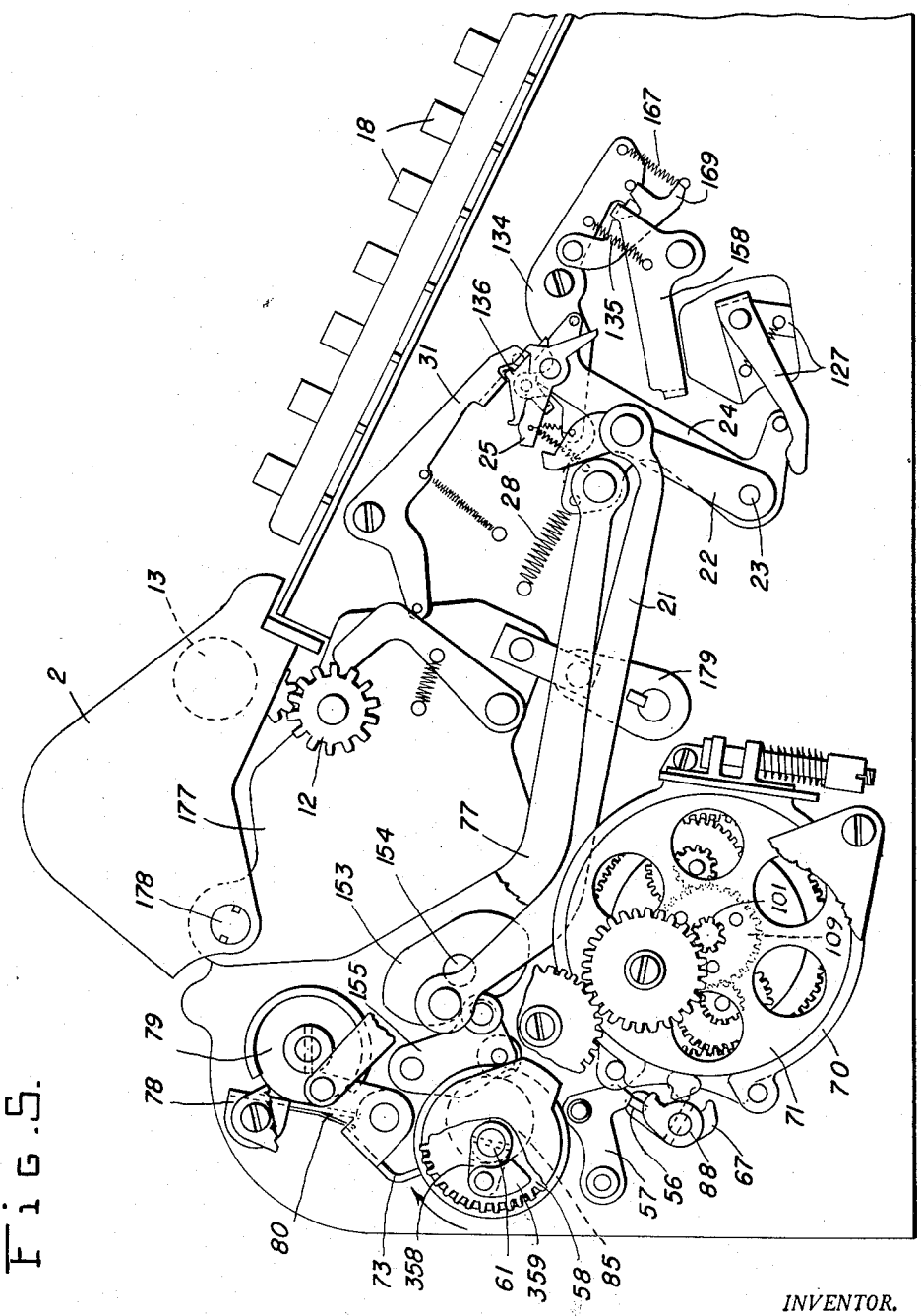

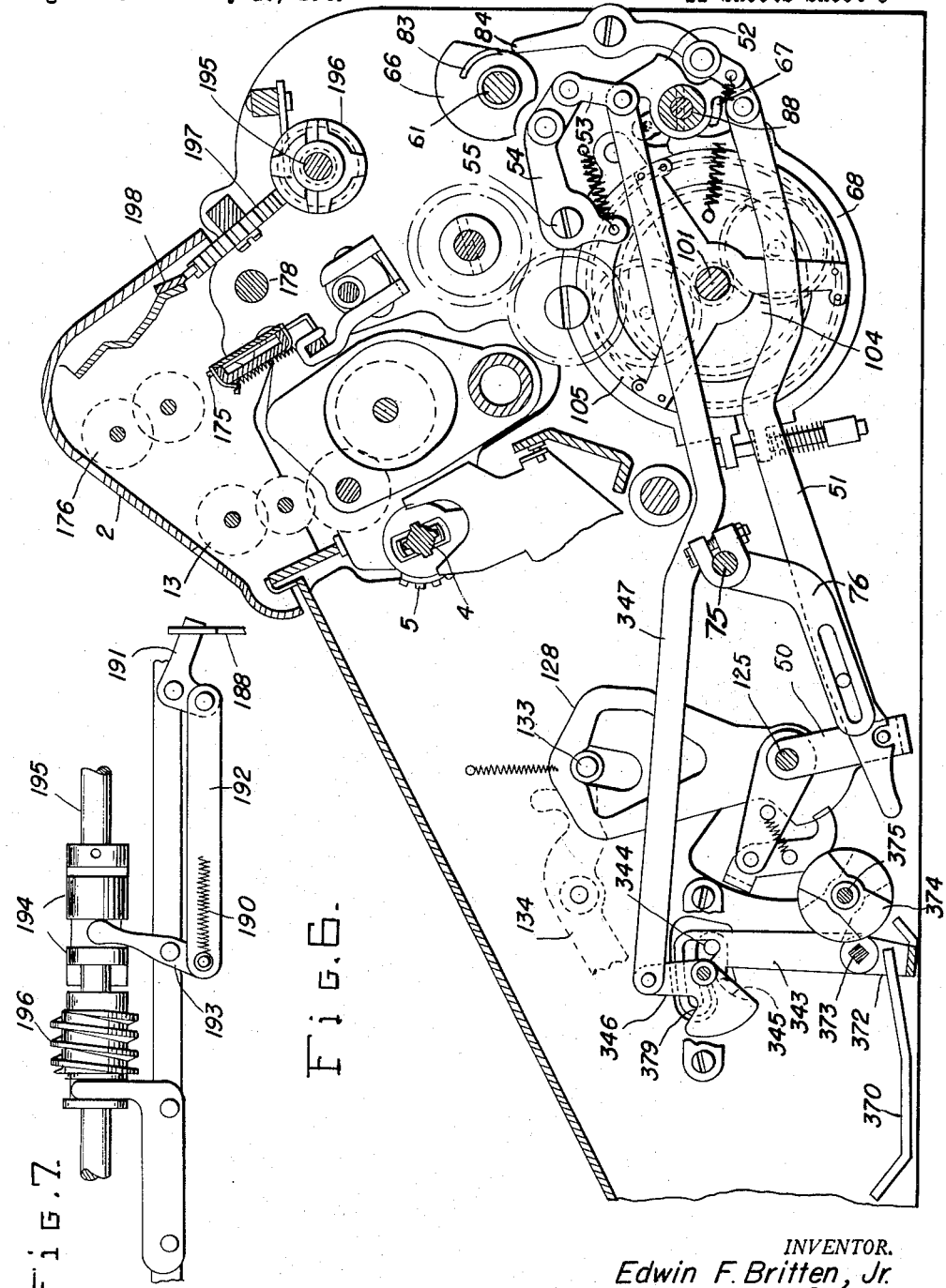

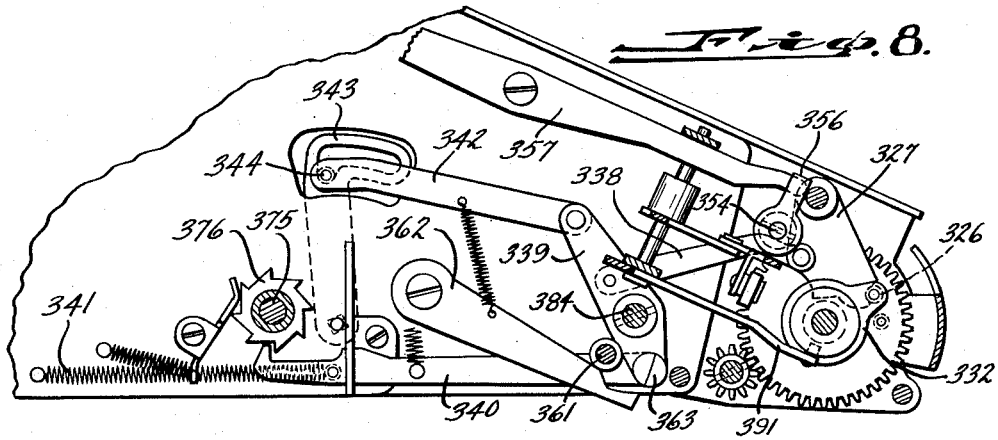
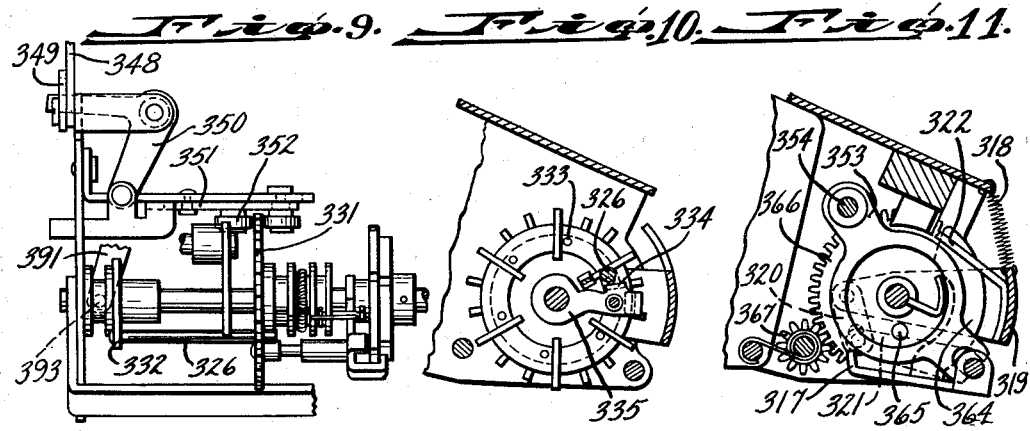
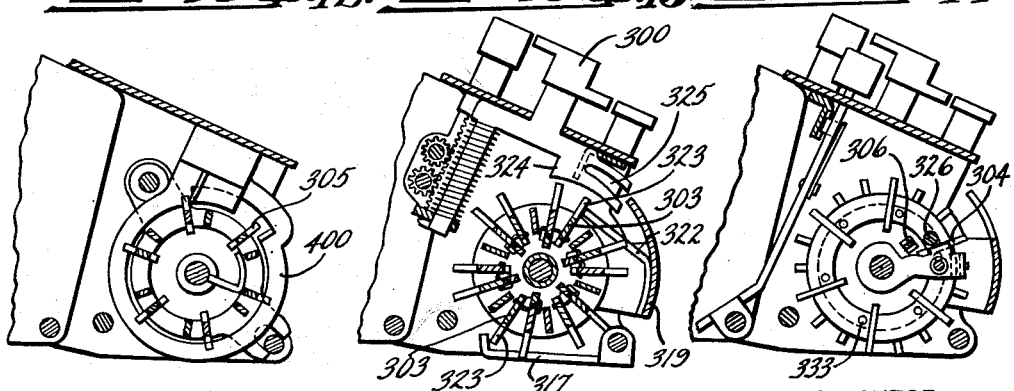

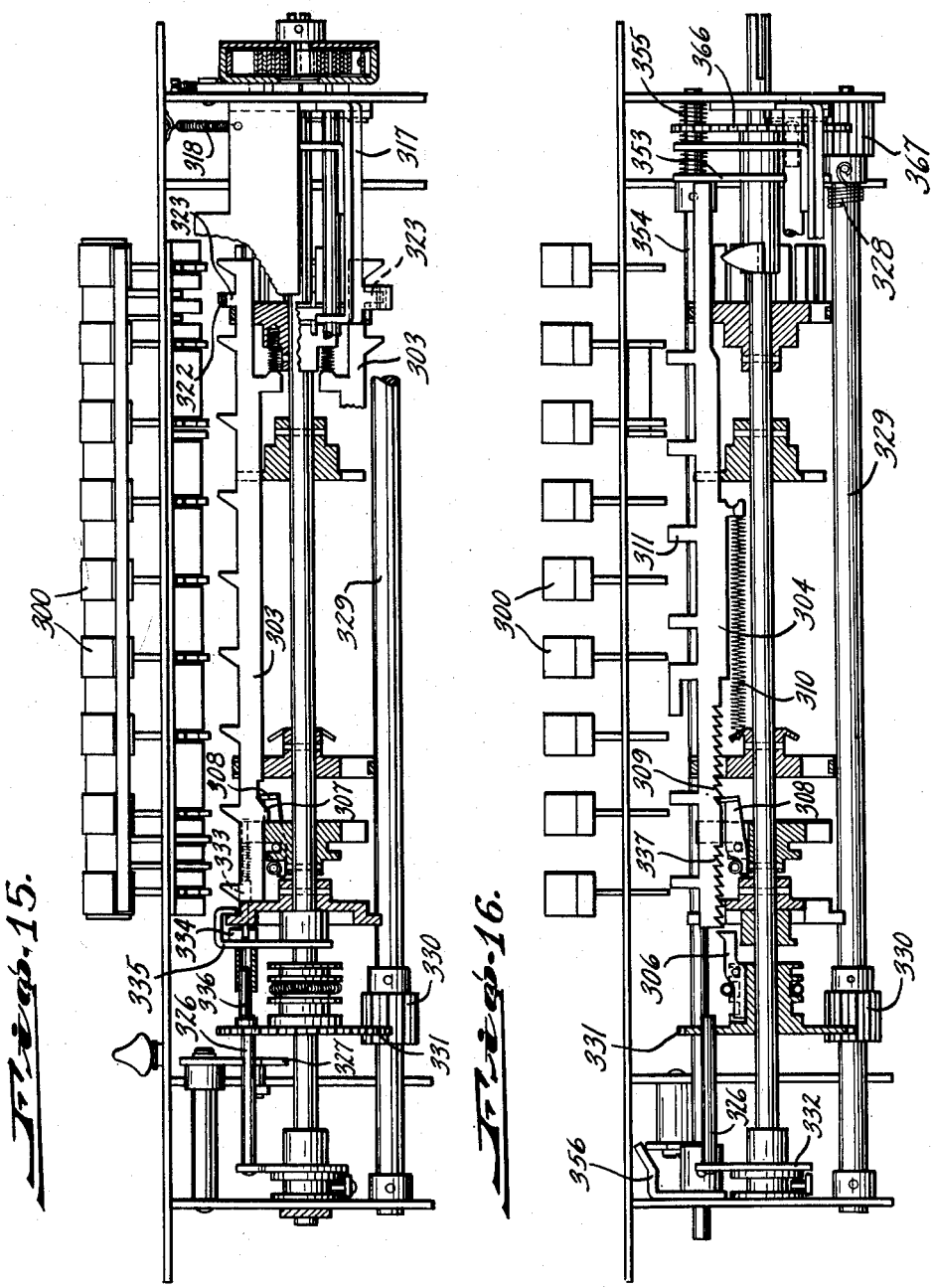

Jan. 23, 1951  E. F. BRITTEN, JR  2,538,896
MULTIPLIER MAGAZINE
Original Filed July 13, 1945  11 Sheets-Sheet 9
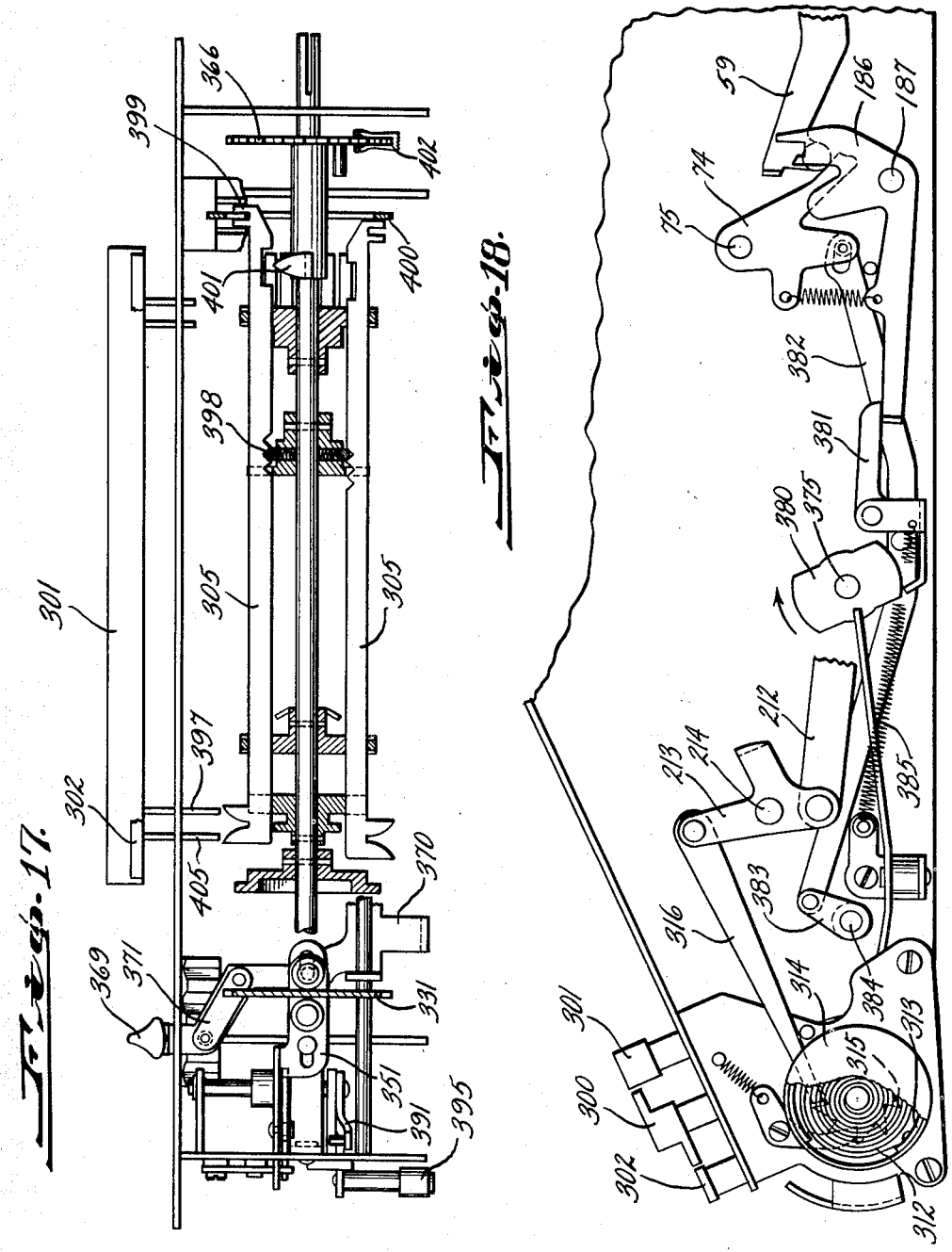
INVENTOR
Edwin F. Britten, Jr.
BY
Witness
Elmer W. Edwards  Stuart Hill ATTORNEY Jan. 23, 1951  E. F. BRITTEN, JR  2,538,896
MULTIPLIER MAGAZINE Original Filed July 13, 1945  11 Sheets-Sheet 10

INVENTOR
Edwin F. Britten, Jr.

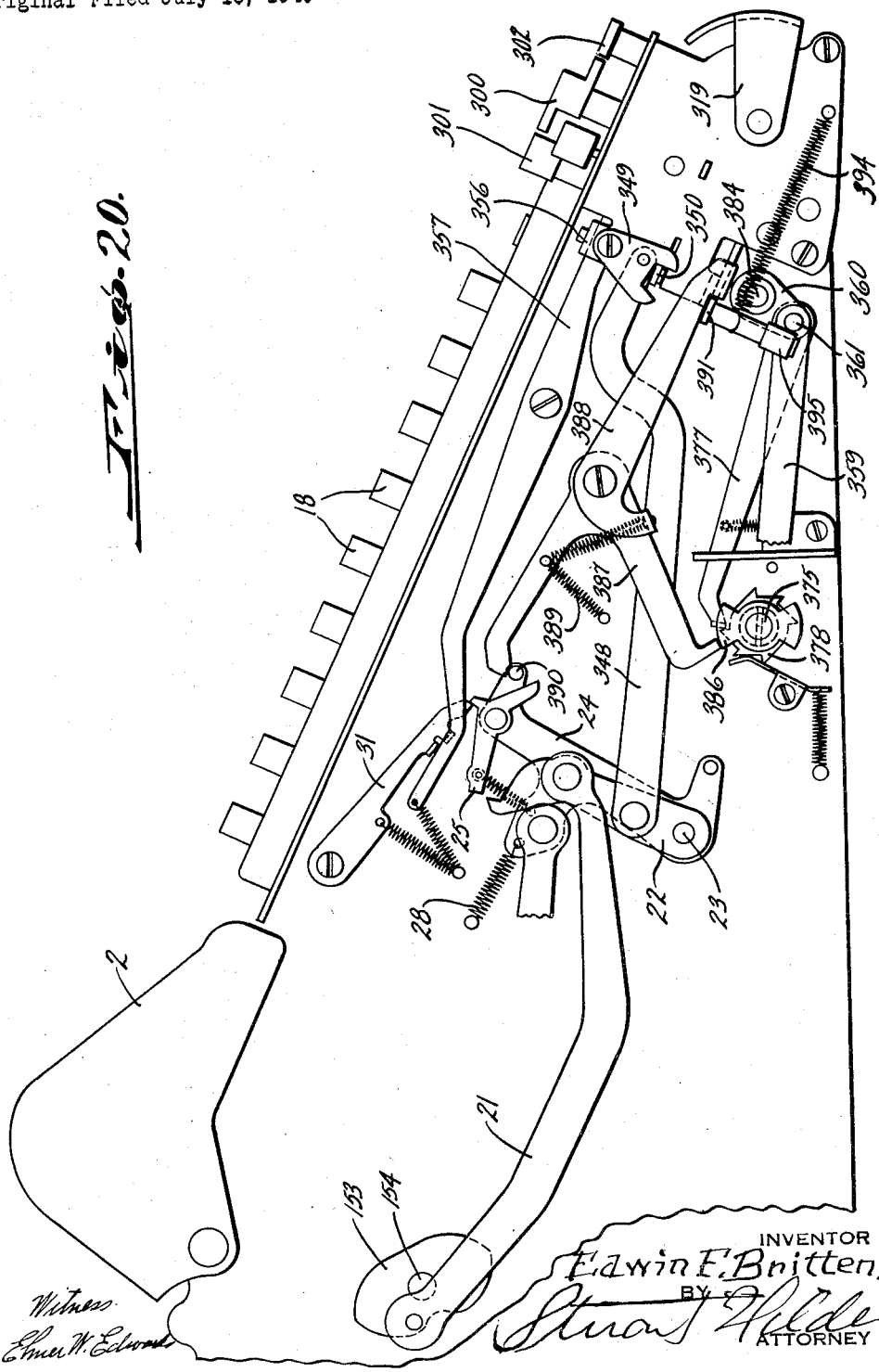

Patented Jan. 23, 1951

2,538,896

UNITED STATES PATENT OFFICE 2,538,896

MULTIPLIER MAGAZINE

Edwin F. Britten, Jr., Short Hills, N. J., assignor to Monroe Calculating Machine Company, Orange, N. J., a corporation of Delaware Original application July 13, 1945, Serial No. 604,851. Divided and this application November 21, 1946, Serial No. 711,253

15 Claims. (Cl. 235—79)

The invention has relation to calculating machines, and more particularly to means for controlling the operation of multiplication, and it consists in the novel construction and combination of parts, as set forth in the appended claims.

This application is a division of application Serial No. 604,851, filed on July 13, 1945, and entitled Calculating Machines.

According to the present embodiment of the invention multiplication is controlled by a magazine having elements settable during the registering operation to represent successive digits of the multiplier, according to the principle disclosed in British Patent Specification No. 156,715, published upon the application of Alexander Rechnitzer, and in machines built in accordance with said specification. It will be understood, however, that certain features of the invention may be employed in multiplier mechanism of other types.

In the accompanying drawings, illustrating the invention:

Fig. 3 is a section taken on line 3—3 of Fig. 4.

Fig. 4 is a rear elevation of the machine with the casing removed and the register carriage partly broken away.

Fig. 5 is a left side elevation of the machine with the casing removed.

Fig. 6 is a section taken substantially on the line 6—6, of Fig. 4.

Fig. 7 is a detail view of the carriage shifting clutch and worm.

Fig. 8 is a left side elevation of the front portion of the machine, with parts broken away.

Fig. 9 is a detail front elevation of the multiplier slide feeding devices.

Figs. 10 to 14 inclusive are detail cross sectional views taken through the multiplier magazine along different lines of section.

Fig. 15 is a longitudinal section through the multiplier magazine, showing the escapement slide mechanism.

Fig. 16 is a similar view, showing the multiplier slide mechanism.

Fig. 17 is a longitudinal section through the multiplier magazine, showing the zero slide mechanism.

Fig. 18 is a right side elevation of the front portion of the machine showing certain multiplication control mechanism.

Figure 19:
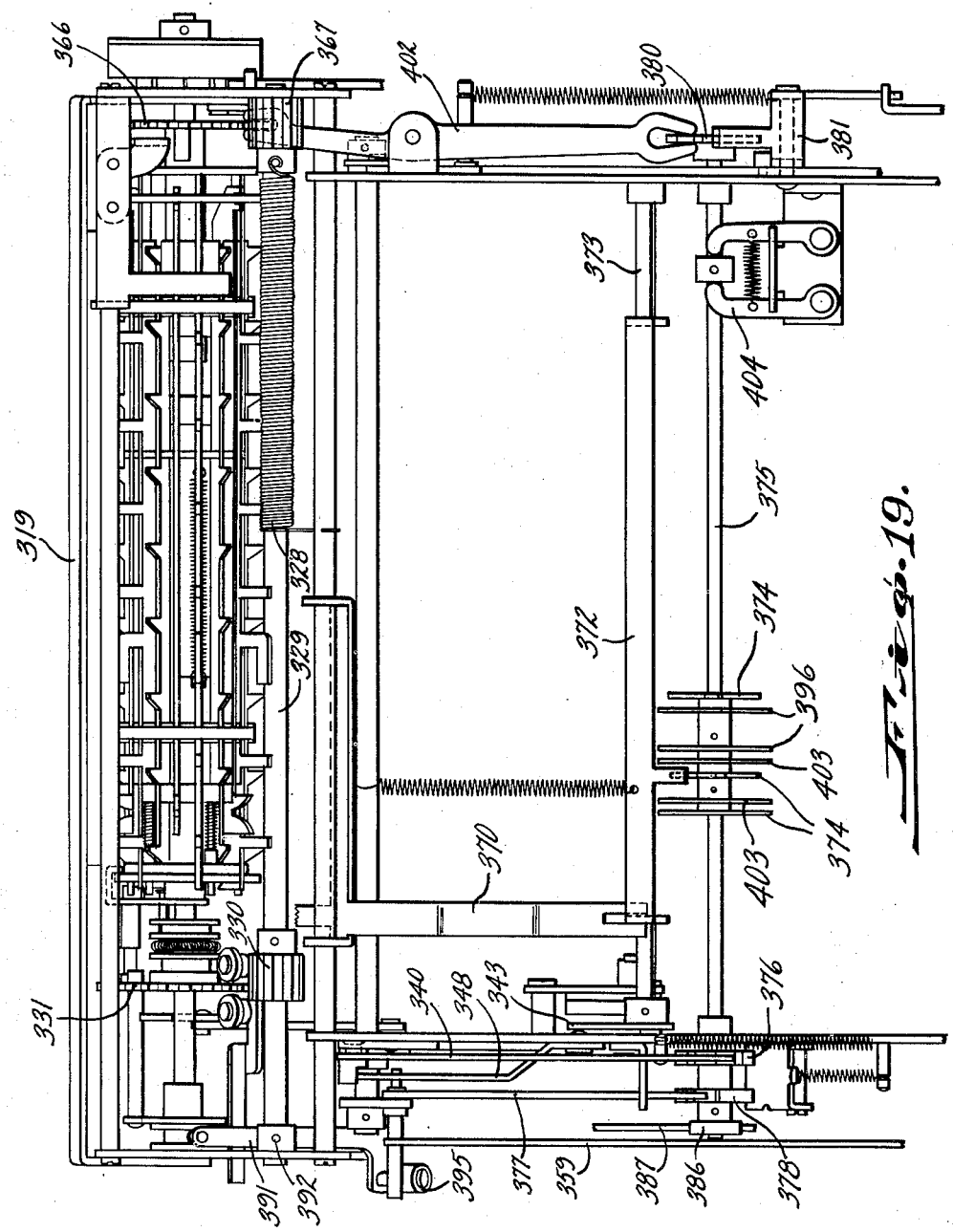

Fig. 19 is a bottom plan view of the front portion of the magazine, showing the multiplier mechanism.

Fig. 20 is a left side elevation of the machine, with casing removed, showing multiplication operation controls.

Amounts set up on the keyboard 18 (Figs. 1 and 3), and thereby upon the differential actuators 5, are registered upon the numeral wheels 13 of the product-dividend register upon operation of the differential actuators in a forward or reverse direction by the operation of an electric motor 100.

Registering operation

Figure 1:
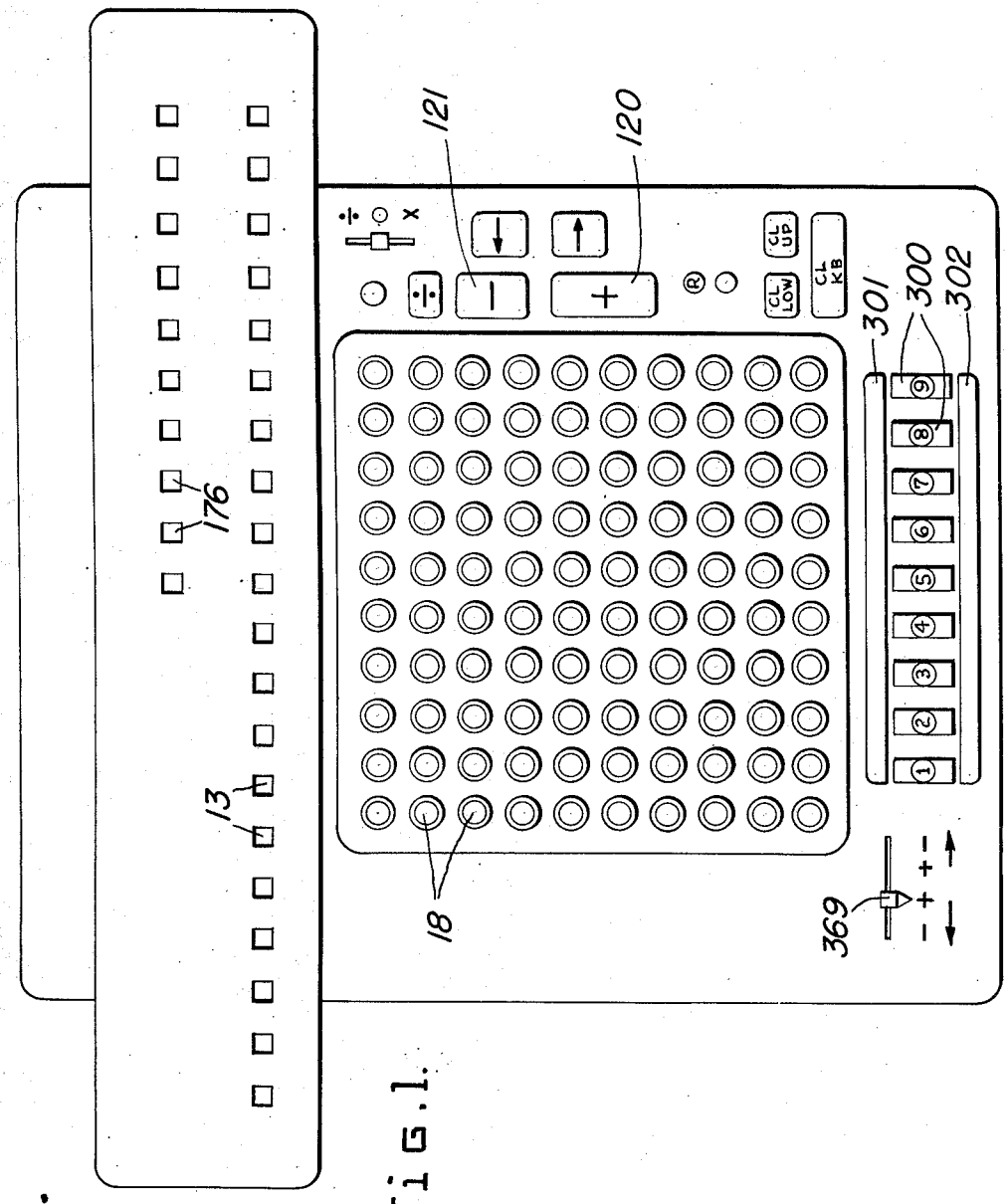
Fig. 1 is a plan view of a calculating machine embodying the invention.
Figure 2:
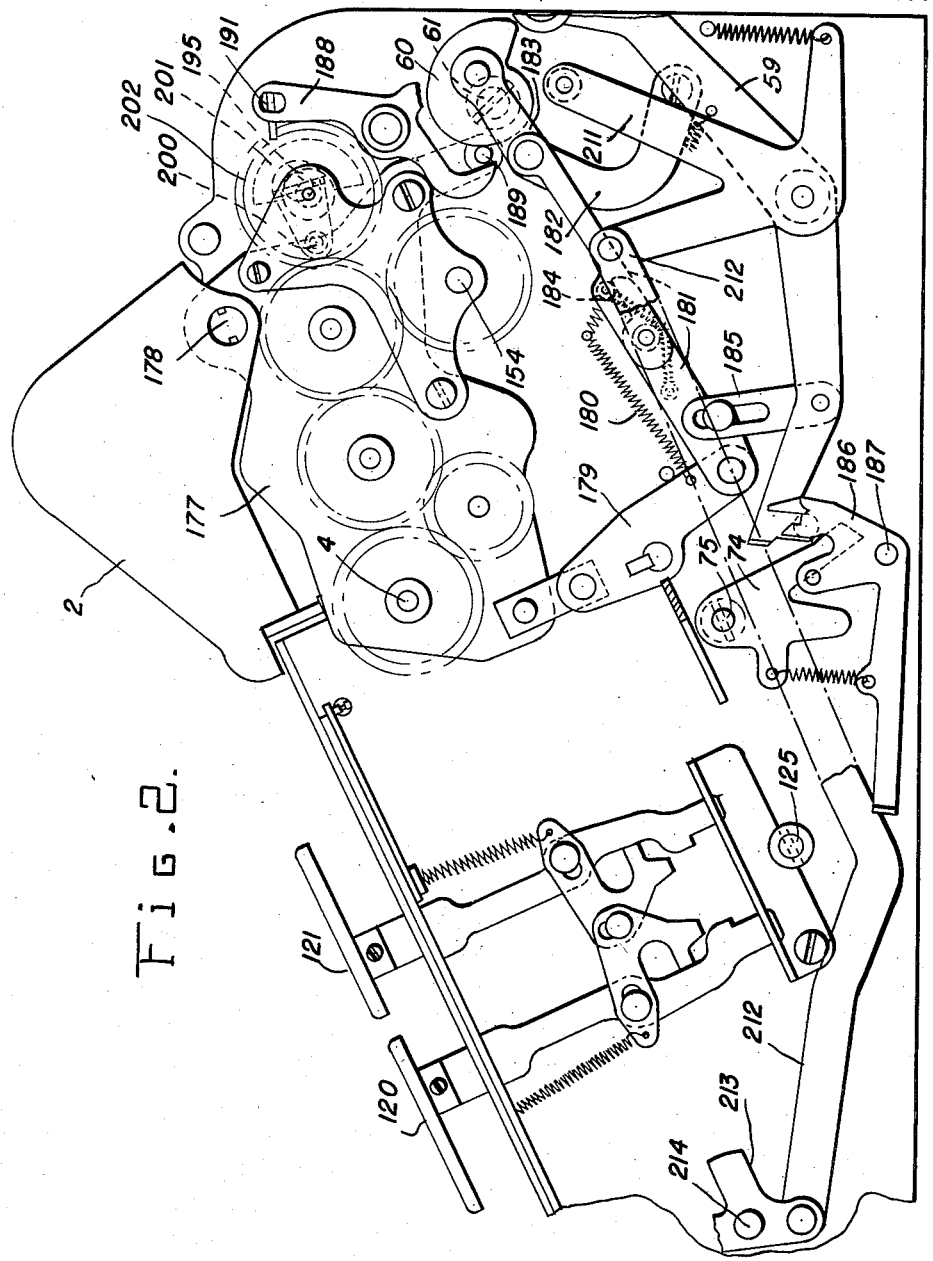
Fig. 2 is a right side elevation of the machine with the casing and other parts removed.

All registering operations on the numeral wheels 13 are controlled by mechanisms which may be described in connection with the operation of plus and minus bars 120, 121 (Figs. 1 and 2). This register controlling mechanism is described in detail in co-pending application Serial No. 604,853 filed July 13, 1945, now Patent No. 2,472,564.

The plus and minus bars operate upon depression to rock a shaft 125 in a clockwise or counter-clockwise direction respectively, as viewed in Fig. 2.

At its left hand end shaft 125 is provided with an arm 50 (Fig. 6) having a stud engaging a slot of link 51, said link being connected at its rearward end with a rocker 52 movable in either direction upon operation of shaft 125 to displace a toggle link connection 53 with a lever 54 (fulcrumed at 55) out of dead-center relation to the shaft 88 upon which rocker 52 is fixed. This movement serves, as will be seen, to set the mechanism for further rotation of the rocker 52 in the selected direction, to engage the main clutch for additive or subtractive operation respectively. Also, the preliminary movement of rocker 52 serves to engage an auxiliary clutch and to close a switch in the motor circuit.

For this purpose an arm 56 (Fig. 5), fixed upon shaft 88, is rotated by the rocker out of supporting engagement with a clutch detent 57, said detent normally acting to hold a cyclically driven clutch 58 in disengaged condition. Clutch 58 has gear connection with the motor shaft 101 and is of a well known type, wherein a pawl in the driven element of the clutch is spring urged toward a ratchet on the driving element, the clutch being disengaged by contact of said pawl with any detent or stop supported in the framing of the machine.

Upon release of clutch 58 by detent 57 a spring impelled arm 59 (Fig. 2) will operate to rotate a cam 60, fast upon the shaft 61 to which the driven element of clutch 58 is secured, thus rotating shaft 61 and a notched disk 62 fast thereon. An intermediately fulcrumed lever 63 has a roller normally engaging the notched disk 62 and having at its lower end a roller of insulating material engaging a spring leaf of switch 64, interposed in the motor circuit. Rotation of shaft 61 will force the roller of lever 63 onto the periphery of disk 62, whereby switch 64 will be held closed.

When the anti-friction roller of arm 59 drops to the low point of cam 60, a forward extension of said arm will displace an arm 74, fast upon a shaft 75. A slotted arm 76 (Fig. 6), also fast on shaft 75, has pin and slot connection with the link 51, so that as shaft 75 is rocked, link 51 will be lifted free of the stud of arm 50 of shaft 125, freeing clutch controlling rocker 52 (Fig. 6) from said shaft.

Upon the initial movement of clutch 58 a cam 66, fast on shaft 61, will be brought into contact with an anti-friction roller of lever 54, and during the remaining portion of the first half cycle of movement of said clutch cam 66 will move rocker 52 further in the selected direction.

Fast to rocker 52 is a member 67 (best seen in Fig. 5) provided with oppositely disposed hook projections. This further movement of rocker 52, following depression of the plus bar, will bring one of the projections of member 67 into contact with a lug formed on a friction band 68 (Fig. 6), closing said band about the periphery of the internally toothed gear 105 of the main clutch. This main clutch comprises a differential gear clutching and direction controlling mechanism constructed in accordance with the disclosure of United States Patent No. 1,566,650, holding of the gear 105 of the differential causing the planet gear assembly to rotate about motor shaft 101, thereby rotating a train of gearing connecting with the shaft 4 of the differential actuators 5, as seen in Figs. 6 and 2.

Depression of the minus bar provides for the rocking of member 67 in the opposite direction, bringing the opposite hook thereof into engagement with the lug of a friction band 70 (Fig. 5) engaging the periphery of a plate 71, fast with a gear 109, loosely mounted on shaft 101 and meshing with the planet gears of the differential. Holding of gear 109 will result in opposite or subtractive rotation of the planet assembly and the differential actuators 5.

Having effected the engagement of the main clutch, auxiliary clutch 58 will be released and held disengaged in mid cycle position by means of a detent 73, whereby switch 64 will be held closed and rocker 52 held in extreme operated position, to maintain pressure upon the friction band of the main clutch. The differential actuators will continue to cycle until the depressed plus or minus bar is released or until the registration in the numeral wheels 13 changes from a positive to a negative character or vice versa. Thereupon, at the end of the current cycle, means will be operated for reengaging clutch 58 and for stopping and locating the differential actuators, this means being controlled by trigger 31 (Fig. 5), and control devices similar to those disclosed in United States Patent No. 1,566,650.

When the plus or minus bar is depressed a plate 128 (Fig. 6) will rock, said plate being connected by a coupling pawl 127 with an arm 126, fast on shaft 125. Plate 128 is provided with opposed cam surfaces engaging an anti-friction roller 133 mouted upon an arm 134 (Fig. 5), movement of the plate in either direction thereby serving to depress the rearward end of arm 134. A spring pawl 136 is mounted on the rearward end of arm 134 and is normally held tensioned by engagement thereof with a lug of trigger 31. Upon movement of arm 134, pawl 136 is moved away from the trigger 31 and will be rotated by its spring into position underlying the lug of said trigegr.

A quick stroke latch 158 is moved by a spring 135 into position beneath the forward extension of arm 134, holding said arm in rocked position until a cycle of the differential actuators has been started. A rock arm 22, pivoted upon the framing at 23, is provided with a link 21, the other end of which has driving crank connection with a shaft 154, driven in one-to-one ratio with the differential actuator shaft. During the first registering cycle rock arm 22 will be brought into contact with quick stroke latch 158, disengaging it from arm 134 and bringing it into camming engagement with an arm 169, pivoted upon arm 134 and connected therewith by a strong spring 167. This will place arm 169 under the influence of restoring spring 167. The restoration of arm 134 involves the return of the plate 128 to normal centralized position, and since shaft 125 is free from the link connection 51, the shaft and plate 128 will be centralized, upon release of the key, by one of a pair of spring arms 81 (Fig. 3). In this return of arm 134 pawl 136 will contact with the lug of trigger 31, thereby raising said trigger out of contact with a pawl 25 carried upon a stopping arm 24. Stopping arm 24 is pivotally mounted upon the framing at 23, and pawl 25, when released from trigger 31, will be moved by its spring into contact with the rock arm 22. As the differential actuators are rotated to their full cycle position, pawl 25 will fall behind a shoulder of arm 22 to couple the arms 22, 24 together for movement as a unit. As the actuators pass beyond full cycle position, arm 24 will be carried forwardly, acting through link 77, to rock the mid cycle clutch detent 73 out of engagement with the pawl of clutch 58. Rocking of detent 73 will also bring said detent into contact with a pivoted plate 78, forcing said plate against a disk 79, whereby further rotation of the actuators in the original direction will be prevented. A leaf spring 80 serves to hold plate 78 normally in light contact with disk 79.

Auxiliary clutch 58, being reengaged, will operate through its last half cycle of movement, thereby dissengaging the main clutch as follows:

Cam 66 (Fig. 6), being rotated, will drop away from the anti-friction roller of lever 54, and a projection 83, fixed upon said cam, will engage the upper arm of an intermediately fulcrumed lever 84, the lower arm of which is provided with an anti-friction roller engaging one of two opposed cam surfaces of the rocker 52 the roller being forced against the rocker to return it to its normal centralized position, thereby disengaging the hook of member 67 from the lug of friction band 68 or 70.

The differential actuators, having been stopped beyond their full cycle position, will be returned to such position and held therein so long as the machine remains at rest. For this purpose an eccentric 85 (Fig. 5) fast with the driven member of clutch 58, engages an anti-friction roller of a pivoted plate 155, a second anti-friction roller on said plate being driven by the eccentric against a locating cam 153 fast upon the shaft 164. Cam 153 is so designed that as clutch 58 comes to its full cycle position, eccentric 85, through plate 155 will rotate the cam, the differential actuator and the parts driven therewith, in either direction back to full cycle position.

Restoration of rock arm 22 to normal position will permit arm 24 to be restored therewith, under the influence of a spring 28, a lug of pawl 25 thereupon engaging the end of trigger 31, whereby the pawl will be lifted free of the shoulder of rock arm 22.

Rocker 52 having been restored to normal position during the last half cycle of clutch 58, arm 50 will have relocated clutch detent 51 in the path of movement of the projecting portion of the clutch pawl, so that the clutch will be disengaged as it is rotated to full cycle position. The notch of disk 62 now being in register with the anti-friction roller of lever 63, the switch in the motor circuit will be open. Also, cam 60 having been rotated to normal position, spring arm 59 will be retensioned and link 51 will be allowed to drop into engagement with the stud of arm 50.

During each cycle of registering movement of the actuators 5, a counting finger 175 (Fig. 3) will operate one of the numeral wheels 176 of a multiplier-quotient register in known manner. The counting finger mechanism may be of any well known design, but is shown herein as conforming to the disclosure of U. S. Patent No. 2,273,237, issued to Edward C. Walter on February 17, 1942, and entitled "Registers."

Non-registering operations

The driving and operation controlling means hereinbefore described are employed in effecting all power operations of the machine, such as shifting of the register carriage 2, clearing the keyboard 18, or clearing the registers 13 and 176. It is, therefore, necessary to disengage the differential actuators 5 from the numeral wheels 13 during non-registering operations; and for this purpose the shaft 4 is mounted on a frame 177 (Fig. 2), pivoted upon the carriage support rod 178 and supported at its free end upon a toggle linkage 179, normally held in dead center position by means of a spring 180. It may be noted that the right hand end of shaft 154 has bearings in an extension of the frame 177, as seen in Fig. 2, whereas the left hand end of said shaft has bearings in the main frame of the machine as seen in Fig. 6, this shaft being of such length that the rocking of frame 177 about point 178 will not interfere with the rotation of the shaft or operation of the gears secured to the opposite ends thereof. The lower link of toggle 179 has a toggle link connection 181 with a pivoted arm 182, driven by a link 183 eccentrically secured to the cam 60. The toggle links 181 are normally held in dead center position by means of a spring 184, but in the machine operations previously described, said toggle 181 is broken by means of a link 185, having pin and slot connection with one of the toggle links 181 and pivotal connection with the forward extension of arm 59. Thus, in registering operations, arm 182 is rocked forwardly, but the toggle 181 is broken, so that the spring 180 will hold the toggle 179 in dead center position, maintaining the frame 177 in raised position.

When non-registering operations are to be performed, a blocking pawl 186 is rotated counter-clockwise about its pivot 187, bringing said pawl beneath a lug formed on the forward end of arm 59. This will allow a partial operation of arm 59, sufficient to close the motor switch and uncouple the link 51, but insufficient to break the toggle 181, this toggle now acting, under the thrust of link 183, to break the toggle 179 and rock the frame 177 into its lower position, wherein the gearing related to the differential actuators 5 is moved out of mesh with the gearing related to the register 13.

When carriage shifting is to be effected an intermediately pivoted lever 188 (Fig. 2) will be freed by the rocking of frame 177 from the restraint of a pin 189, fixed in said frame, allowing lever 188 and the parts connected thereto to rock under the influence of a spring 190 (Fig. 7). Lever 188 is connected by means of a bell crank lever 191 and link 192 with a shipper arm 193, engaging the grooves of a clutch element 194, splined to a carriage shifting shaft 195 (see also Fig. 4), so that in the movement of frame 177 to its lower position, spring 190 will move clutch element 194 into contact with a cooperating clutch hub of a shifting worm 196', engaging a pinion 197 which in turn meshes with the teeth of a rack 198 fixed upon the register carriage 2. Yieldable toothed pawls 199, at the ends of rack 198, provide for one way shifting operation when the carriage stands in either of its extreme shifted positions.

The shifting shaft 195 is driven through a pin 200 fixed in an arm fast upon the right hand end of said shaft (the left hand end in Fig. 4), pin 200 being engaged by one of the opposite faces of a plate 201 mounted upon a stud fixed in an extension of the pivoted frame 177. A gear 202 is fast with plate 201, and meshed with the driving gearing mounted in pivoted frame 177. It will be noted that the driving connection 200, 201 provides for lost motion in the drive of carriage shifting shaft 195, this being provided in order that the carriage may be shifted and stopped as the shifting means comes to full cycle position, whereas the differential actuators are allowed to run beyond full cycle position in stopping. The disk 79, described in connection with the full cycle stopping means, is mounted on the left hand end of carriage shifting shaft 195, the spring 80 serving through plate 78 to hold the carriage shifting parts in full cycle position, as the actuators are returned from overrun to full cycle position.

The shaft 203 (Fig. 3) on which the counting finger 175 is mounted is journaled in the pivoted frame 177, but since shaft 203 received little bodily movement when frame 177 is dropped, a lever 204, pivoted upon the frame 177, will fulcrum upon a pin 205, in the fixed framing of the machine, the rear end of said lever being depressed when frame 177 is rocked, to hold the yieldably mounted counting finger 175 out of counting relation to the numeral wheels 176 during non-registering operations.

Automatic multiplication

Multiplication is performed by repeated addition of the multiplicand, and is controlled by a storage magazine, wherein values are set up by a row of multiplier keys 300 (Figs. 1, 13 and 16) and by program devices which determine the proper alternation of calculating and shifting operations and the direction of drive during such operations. The magazine also contains storage devices, controlled by a 0 multiplier key 301 and a carriage return key 302, acting to reset the program devices so that carriage shifting may be substituted for calculating during given periods of the operation.

As shown, the capacity of the magazine allows for the storage of six multiplier digits, the magazine including escapement devices comprising six slides 303 (Fig. 15) mounted in the end plates of the rotary magazine and controlling the rotation thereof; value storage or duration control elements comprising six slides 304 (Fig. 16) differentially settable under control of the multiplier keys 300; shift selection devices, comprising six slides 305 (Fig. 17) under control of the 0 multiplier and carriage return keys 301, 302, and devices including a pawl 306 (Fig. 16) for feeding the slides 304 step by step toward their operation terminating position.

Upon each release of a multiplier key, the magazine is rotated or stepped, to bring a second set of slides 303, 304 and 305 into position beneath the key stems, and the feeding pawl 306 is carried around with the magazine. The multiplying operation is initiated as the magazine makes its first step out of normal position, and upon the completion of the computation of each multiplier digit, the feeding devices will be rotated or stepped reversely, so that the feeding pawl 306 will act upon the succeeding slide 304. When the reverse rotation of the feeding devices brings them back to normal position, the operation of the machine will be concluded.

Upon depression, the stem of any key 300 will contact with the beveled face of a related tooth formed in the escapement slide 303 which may at the time be located beneath the keys, moving said slide toward the right. Each slide 303 is provided with a cam face 307 engaging the tooth of a pawl 308, mounted in a guide plate of the magazine and engaging also one of a series of ratchet teeth 309 (Fig. 16) of the related slide 304. Slides 304 are urged toward the left by a spring 310, and held by the pawl 308. Upon depression of key 300, and movement of slide 303 to the right, pawl 308 will be rocked and slide 304 will be released, moving to the left under influence of spring 310 until stopped by engagement of a projection 311 of the slide with the stem of the depressed key. Projections 311 are located at varying distances from the key stems, and thus provide for the setting of slides 304 in accordance with the key values.

The magazine is urged in clockwise direction as viewed in Figs. 10 to 14 by a coil spring 312 (Fig. 18) having one end secured to the magazine shaft and the other end fast to a friction shoe 313 engaging the flange of a drum 314 loosely mounted upon the magazine shaft. The drum is provided with a ratchet 315 engaged by a holding pawl, and also engaged by an advancing pawl 316, fixed upon an arm 213, said arm being oscillated during operation of the auxiliary clutch by means of cam 60 and link 212 (Fig. 2), and thereby serving to maintain the tension of spring 312.

Normally, the magazine is held against rotation by means of a latch 317 (Figs. 11 and 13), pivoted upon the framing of the machine, and held in latching position against the operation of a spring 318 operating through plate 319, pivotally supported upon the magazine shaft, link 320 and arm 321 of the latch. Holding of the latch in operated position is effected by an extension 322 of plate 319, engaging a lug 323 (Figs. 13 and 15) of one of the slides 303.

Upon depression of a key 300 lug 323 will be moved out of engagement with extension 322, and spring 312 will act to give the magazine a partial step of clockwise rotation, bringing a cam tooth of the succeeding slide 303 into contact with a shoulder 324 of the key 300.

The release of plate 319 has also effected an interlocking of the multiplier keys, so that the key first depressed must be restored before any other multiplier key may be depressed. This is effected by engagement of the upper edge of plate 319 with the walls of notches 325 of the undepressed keys 300. Plate 319 also engages above the stem of the depressed key, but the key is allowed sufficient movement, under influence of its spring, to move the shoulder 324 of the key stem out of contact with the cam lug of the slide 303, thus allowing completion of the step of rotary movement of the magazine, and bringing the cam lug of the slide 303 into contact with extension 322, rocking plate 319 back to normal position to release the depressed key and re-effect engagement of latch 317.

In the normal position of the parts a pin 326 (Figs. 8 and 15) of the feeding mechanism engages a latch 327, pivoted upon the machine frame, whereby the feeding pawl 306 is held out of operative relation with the slide 304, against the tension of a spring 328 (Figs. 16 and 19). One end of spring 328 is anchored to a shaft 329; the other end of the spring engaging a rod fixed in the machine frame. A pinion 330 is fast on the shaft 329 and engages a gear 331 upon the hub of which feeding pawl 306 is mounted. The pin 326 is carried in an arm 332, loosely mounted upon the magazine shaft, the pin engages a perforation of gear 331, whereby it is rotated as a unit with the feeding pawl. This normal position of the parts is illustrated in Fig. 14, the feeding pawl 306 being out of line with the slides 304 and the pin 326 being out of line with the pins 333 now to be described.

Upon rotation of the magazine, following release of the operated key 300, the parts will be brought to the position illustrated in Fig. 10, wherein spring 328 holds the feeding mechanism in position with a lug 334 of the feeding mechanism in engagement with one of the pins 333, mounted in the end plate of the magazine. Lug 334 is formed on an arm 335 loosely mounted upon the magazine shaft and having tube and plunger connection 336 with gear 331. This connection permits relative axial movement between arm 335 and the feeding pawl 306, axial movement of gear 331 with pawl 306 being provided for by the elongation of pinion 330.

Rotation of the feeding pawl 306 into feeding position relative to a slide 304 will bring the tooth of said pawl opposite the end of the slide, if it has not been set toward the left, or into engagement with one of a series of ratchet teeth 337 (Fig. 16) of the slide in case it has been set toward the left. The machine will now be started and pawl 306 reciprocated as follows:

Upon release of the key 300 the stepping forward of the magazine will bring one of the pins 333 against lug 334 of arm 335, carrying the feeding devices forward to the position illustrated in Fig. 10, and thereby carrying pin 326 away from latch 327. Latch 327 is connected by link 338 (Fig. 8) with an intermediately fulcrumed lever 339, the lower arm of said lever being provided with a pawl 340, urged toward the rear of the machine by a spring 341. Upon disengagement of latch 327 by pin 326 spring 341 will act to rock lever 339 in a clockwise direction as viewed in Fig. 8, and a rod 342 pivoted to the upper arm of said lever will be carried forward. The rearward end of rod 342 is supported upon a rock arm 343 and is provided with a pin 344, operable during the forward movement to engage the lower cam surface 345 (Fig. 6) of a bell crank lever 346, rocking said bell crank lever in a clockwise direction as viewed in Fig. 6 and, through link 347, moving the rocker 52 clockwise, to effect engagement of the auxiliary clutch and setting of the main clutch for additive operation, as previously described. Operation of the main clutch will effect cyclic oscillatory movement of lever 22 (Fig. 20), and movement of this lever is utilized to reciprocate the feeding pawl 306, by means of a link 348, connecting arm 22 with a rocker 349, said rocker in turn engaging one arm of a bell crank lever 350 (Fig. 9), the other arm of which is pivotally connected with a slidable yoke 351, having a pair of antifriction rollers 352 engaging opposite faces of the gear 331, which acts as a shifting collar. Thus gear 331 and feeding pawl 306 are reciprocated once during each cycle of operation of the machine, pawl 306 moving slide 304 step by step toward the right, to and beyond its normal position.

Projections 311 of the slides 304 are so related to the stems of the multiplier keys 300 that the depressed key representing a multiplier value of one allows no movement of the slide; the two key allows for a one step setting movement, etc., the nine key allowing an eight step movement. Therefore movement of a slide 304 beyond normal position occurs during the last multiplier cycle. Control of the full cycle stopping means by slide 304 is effected by any movement of the slide toward the right from normal position. Since there is no ratchet tooth 309 to hold slide 304 to the right of its normal position, the slide will be returned by its spring 310 as soon as feeding pawl 306 has been retracted. As will be seen, this arrangement is particularly useful in controlling a single cycle of operation to effect shifting of the carriage after completion of a multiplier digit registration.

In moving to the right from normal position, slide 304 will engage an arm 353 (Figs. 11 and 16), formed as an annulus, and rigidly secured to a slidably mounted shaft 354, normally held toward the left by means of a spring 355. Fast to the opposite end of shaft 354 is a cam plate 356 (Figs. 8, 16 and 20), overlying the forward end of an intermediately pivoted lever 357, the rearward arm of which overlies a lug of the trigger 31, controlling the full cycle stopping means in the manner previously described. Therefore, movement of slide 304 to the right will move shaft 354 therewith, and cam plate 356 will operate lever 357 to trip trigger 31 and effect the stop.

The machine will be automatically restarted as follows:

During the first half cycle of the auxiliary clutch an arm 358 (Fig. 5) fast to the driven member of said clutch will be operated, said arm being connected by means of a link 359 with an arm 360 (Fig. 20). The pivot pin 361 of this connection is extended to the opposite side of arm 360, in position to engage a stud 363 of lever 339, as seen in Fig. 8, so that during this preliminary movement of the auxiliary clutch lever 339 will be rotated counter-clockwise, moving pin 344 away from bell crank lever 346. After the calculating operation has been completed, the final half cycle of the auxiliary clutch will cause pin 361 to move away from lever 339, allowing spring 341 to operate said lever again, to re-engage the auxiliary clutch and set the main clutch for operation in the appropriate direction. In order to delay this reclutching action somewhat, lever 339 is held in operated position by means of a latch 362, engaging stud 363 of said lever, latch 362 having a cam portion engaged by pin 361 to release the latch as said pin moves away from lever 339.

The machine being restarted, feeding pawl 306 will again operate the same slide 304 to terminate the shifting operation at the end of one cycle of the driving means.

The direction in which the carriage is shifted, the lowering of frame 177 to effect shifting rather than calculation, and the subsequent release of the feeding devices from the magazine so that they will be stepped back by the action of spring 328 is determined by means of the program mechanism, which will be presently described.

The stepping back of the feeding devices is effected by axial movement of the hub of arm 332 (Figs. 8 and 9), whereby pin 326 will engage the pin 333 (Fig. 10) against which lug 334 of arm 335 rests, this pin 333 being pushed back against the tension of its spring, to release said arm, whereupon spring 328 will rotate the feeding devices backward, until the succeeding pin 333 of the magazine contacts lug 334, to hold the feeding devices in operative position relative to the succeeding slide 304.

It will be obvious that calculation may occur with the feeding devices located opposite any of the slides 304 which are not immediately beneath the keys 300, and that the operation may proceed while the magazine is rotating. Also, the feeding devices may be stepped back upon completion of each calculation without reference to the future operation of the keys 300 or the position of the feeding devices relatively to the magazine. In other words, the operator may depress the keys 300 as rapidly or as slowly as desired, and the machine may operate at a fixed speed, without hindrance by the setting up of the multiplier. The magazine has been designed to provide for operation without interruption of the setting up of the multiplier under all ordinary conditions. That is to say, the capacity of six places in the magazine is designed in relation to the capacity of the register carriage 2, which may be shifted into ten different positions relatively to the differential actuators. Means are provided, however, to lock the keys 300 temporarily against operation, in case all six slides 304 have been set before the completion of the operation controlled by the first of the six slides.

For this purpose an extension 364 (Fig. 11) is provided on the latch 317, this extension being movable, when the latch is released, into the path of movement of a pin 365, fixed in a gear 366, which is driven from a pinion 367, fast upon the feeding shaft 329. Thus pin 365 will be carried around with the magazine in fixed relation to the feeding pawl 306, and when the depression of a key 300 and stepping of the magazine brings pawl 306 into operative relation with a slide 304 located just to the left of the keys 300 as viewed in Fig. 13, pin 365 will be positioned opposite the extension 364 of latch 317. In this position of the parts, a key 300 may be depressed as usual, moving the lug 323 of slide 303 away from the extension 322 of plate 319. However, pin 365 will prevent the release of latch 317, certain lost motion in the link connection 320 permitting plate 319 to be rotated counter-clockwise by spring 318, bringing the upper edge of said plate into position above the stem of the depressed key and into the notches 325 of the remaining keys 300. Thus the depressed key will effect the proper setting of slide 304, and will be locked in depressed position as a signal to the operator that the capacity of the magazine has been reached. Upon conclusion of the calculation in this position of the magazine, and the succeeding shifting of the carriage, the feed devices will be free from the magazine (all as described later in connection with the program mechanism) said feed devices will be stepped back in a clockwise direction, removing pin 365 from beneath the extension 364 of latch 317. Spring 318 will now move plate 319 further in a counter-clockwise direction, releasing latch 317, after which engagement of a cam projection of the succeeding slide 303 will engage extension 322 of plate 319, rocking the plate clockwise and reengaging latch 317, the machine now being free to continue the calculation of the remaining quotient digits, including that set up at the time the keys were locked.

The multiplier program mechanism hereinbefore referred to is preset by appropriate adjustment of a knob 369 (Figs. 1 and 17) projecting above the keyboard plate, and rigidly secured upon a sliding frame 370. Knob 369 is yieldably held in one of four positions by means of a spring latch 371, these positions providing for plus or minus registering operation and for right or left carriage shift, as indicated by the designations on the keyboard plate. The sliding frame 370 has a slotted end engaging one supporting arm of a bail 372 (Figs. 6 and 19) slideably secured upon the square shaft 373 to which rock arm 343 is also secured. Bail 372 is provided with a rearward extension movable by the sliding frame 370 into relation with one or another of a series of blocking plates 374, fixed upon the program shaft 375. It may be noted that there are three plates 374, and that in one position of sliding frame 370, the extension of bail 372 will not register with a blocking plate.

Program shaft 375 is given an eighth rotation during each half cycle of operation of the auxiliary clutch, rotation of the shaft during the first or preliminary half cycle of the clutch being effected by the pawl or tappet 340 (Fig. 8), mounted upon the pin 361 and operating upon a ratchet 376, fixed upon shaft 375, and movement of the shaft during the final half cycle of the auxiliary clutch by means of a pawl or tappet 377, also mounted upon the pin 361 (Fig. 20) engaging a ratchet 378, also fast upon the program shaft.

Rotation of shaft 375 will position the blocking plate relative to the extension of bail 372, certain of the plates providing for the alternate blocking and unblocking of bail 372, shaft 373 and rock arm 343. When rock arm 343 is blocked against movement the rocking of lever 339 (Fig. 8) occurring upon the final half cycle of the auxiliary clutch will move the pin 344 out of a cam slot of rock arm 343, so that the pin 344 will travel in a higher path, engaging an upper beveled surface 379 (Fig. 6) of the bell crank lever 346, rocking said bell crank lever in a counter-clockwise direction and moving rocker 52 also counter-clockwise to effect subtractive or left shift operation of the driving means.

In the position of knob 369 illustrated in Fig. 1, the registration is to be additive, and the carriage is to be shifted toward the left, in order that the keys 300 may be operated successively to set up the multiplier digits from higher to lower order, in the natural reading succession.

Therefore, the blocking plate 374 shown engaged by the extension of bail 372 in Fig. 19 is provided with two blocking surfaces, and with two cutaway portions providing for free movement of rock arm 343. During registering operations, the cut-away portion of the plate will be opposite the extension of the bail, and pin 344 will move in its lower path, setting the machine for addition, while during a shifting operation (which follows a quarter rotation of the program shaft) the blocking portion of the plate will be opposite the extension, the pin 344 will move in its upper path, and the main clutch will be set for left shift operation.

It will be obvious from an inspection of Figs. 1 and 19 that the right hand plate 374 will be similar to the cam just described, but will be secured upon shaft 375 so as to reverse the direction of the registering and carriage shifting actions; that the left hand plate 374 will be a complete disk, serving to block the rock lever in all positions of the program shaft, and that the fourth position of bail 372 will locate the extension thereof opposite a blank space between the two right hand plates 374.

A blocking plate 380 (Fig. 18) fixed upon program shaft 375 controls the position of frame 177, to control the occurrence of registering or alternatively of carriage shifting operations, as follows:

Normally plate 380 is engaged and serves to restrain a spring pressed finger 381 which engages the blocking pawl 186, the plate being so designed that during the first quarter rotation of shaft 375 the finger will be retained in restrained position. Finger 381 is also restrained by a pin fixed in a link 382, pivoted upon an arm 383 which is secured upon the shaft 384 upon which lever 339 is fixed (Fig. 8). Upon release of the latch 327, and before the start of the preliminary cycle of the auxiliary clutch, shaft 384 will be rocked and the pin of link 382 will be moved away from finger 381. This condition of the parts will be repeated whenever the auxiliary clutch is engaged, engagement of the clutch being immediately followed by operation of the toggle breaking arm 59. At this time arm 358 and link 359 are working about dead center position, so that the movement of the pin against the finger 381 will be delayed until arm 59 has operated. Therefore, during the preliminary cycle preceding a registering operation, blocking plate 380 will prevent operation of finger 381, but said blocking plate is so formed that during the preliminary cycle preceding a carriage shift, the blocking portion of the plate will be out of line with finger 381, and the spring 385 of said finger will operate to rock the blocking pawl 186 into position beneath the end of arm 59, so that frame 177 will be rocked into carriage shifting position. The other end of link 382 has pin and slot connection with arm 74 and serves to disconnect the manual control means when shaft 384 is rocked.

Program shaft 375 controls the release of the feeding devices, for backward rotation relatively to the magazine, as follows:

A blocking plate 386 (Fig. 20) is fast upon the left hand end of shaft 375, said plate normally holding a latch tripping arm 387 in raised position, against the tension of a spring 389. An extension of arm 387 normally contacts with a pin 390, fixed in the full cycle stopping arm 24. The first eighth rotation of shaft 375 leaves blocking plate 386 still in engagement with the arm 387, in which position of the parts the full cycle stopping means will operate to terminate the calculating operation. During the final half cycle of the auxiliary clutch following the calculation, shaft 375 will again be rotated, bringing the blocking portion of plate 386 out of line with arm 387. The tripping arm is, however, held in restrained position at this time by pin 390 until, at the conclusion of the carriage shifting operation, arm 24 is carried forward, when pin 390 will release the arm 387 for operation by spring 389. A latch 388 has operating engagement with arm 387 and a lug normally engaging and serving to restrain a spring operated lever 391 (Figs. 9, 19 and 20), fulcrumed at 392 and provided with a pin 393 engaging a grooved hub of the arm 332 which carries plunger pin 326. Upon release of lever 391 spring 394 will, therefore, operate to move plunger pin 326 toward the right, engaging and retracting the related pin 333, to release the feeding devices. Lever 391 will be restored to latched position by means of the pin 361 engaging a roller 395, carried by lever 391.

Zero multiplier key

According to the invention a zero multiplier, or a series of such zeroes, may be provided for by operation of the appropriate key 300 in conjunction with the depression of the zero key 301 (Fig. 17). For instance, a series of three zeroes would call for the depression of the 3 multiplier key and of the key 301. Key 301 extends across the series of multiplier keys, and near its left hand end is provided with a stem 397 adapted to engage a cam extension of slide 305, to move said slide toward the right, in which position the slide will be held temporarily by a detent 398. As slide 305 is moved out of the setting position, by rotation of the magazine, a channeled lug 399 of said slide will engage an annular frame plate 400 (Fig. 12), whereby the slide will be held rigidly as set until it has been carried completely around with the magazine, back to the setting position, where it will escape into a slotted portion of the annular plate and will be reset to normal position by means of appropriate guide cams.

As the feeding devices are brought into operative relation with set slides 305 (that is to say, into the position in which the related slide 304 is to be operated by pawl 306) one of the walls of a notch of said slide 305 will be engaged by a cam finger 401, fixed upon the hub of the gear 366. Gear 366 is slideably mounted upon the magazine shaft, and contact of slide 305 with the cam finger will therefore move the gear to the right. A lever 402 (Fig. 19) has a forked end engaging the gear 366, the opposite forked end of said lever engaging the plate 380 of program shaft 375. Therefore, movement of gear 366 axially to the right will set the program shaft 375 to the left. This will have the effect of removing blocking plate 380 from position opposite the finger 381, allowing said finger to set the blocking pawl for the carriage shift operation; will bring one of a second series of blocking plates 403 or appropriate blank spaces into relation with the extension of bail 372, in place of the blocking plates 374, and will disable the program shaft rotating means by moving the ratchets 376 and 378 away from the related pawls. Blocking plates 403 are complete disks, since they have no relation to the stepping of the program shaft, the bringing of a plate 403 or of a blank space into line with the extension 372 acting to effect the same directional operation of the main clutch as is called for by the adjustment of knob 369 in normal carriage shifting operations.

It will be apparent that whenever the feed devices are brought into line with a set of slides wherein slide 305 stands set to the right, carriage shifting will occur, and that the shift will continue until the related slide 304 is moved to the right, beyond normal position, whereupon the full cycle stopping means will be operated. Blocking plate 386 having been moved with shaft 375, out of engaging position with arm 387, operation of the stopping means will effect the release of lever 391, and backward rotation of the feeding devices. This will disengage cam finger 401 from slide 305, whereupon a spring centralizing device 404 (Fig. 19) will act to return program shaft 375 to normal position.

The carriage return key 302 cooperates with the multiplier key 300 in a manner similar to that of the key 301, simultaneous depression of key 302 and a multiplier key 300 effecting reverse shift of the carriage one or more places. This return shift may be either to the right or to the left, but is always in the opposite direction to the normal multiplier shift indicated by the position of knob 369. The stem 405 of key 302 operates upon the opposed cam surface of the slide 305, setting said slide toward the left, where it is locked upon rotation of the magazine by engagement of the lugs 399 with the left face of annular plate 400. Engagement of the cam finger 401 with the wall of the notch in slide 305 now serves to move gear 366 to the left, and therefore to move program shaft 375 to the right, bringing a third series of blocking plates 396 and blank spaces into cooperative relation with the extension of bail 372. The plates 396 are complete disks, the disks and blank spaces serving to reverse the directional operation of the main clutch, relative to the operation provided for during the shift by the blocking plates 374.

I claim:

1. In a motor driven calculating machine having a product register, cyclic differential actuators therefor, and full cycle stopping means for said actuators; means for controlling multi-cycle operation of the differential actuators, including multiplier keys, a rotary magazine, power means operable in response to manipulation of said keys to rotate the magazine, slides mounted in said magazine and differentially settable by said keys, escapement means operable by the keys to permit stepwise rotation of the magazine to bring successive unset slides into setting position, connections engageable by the slides to operate the stopping means, a reciprocable lever driven in time with the differential actuators, devices rotatable with the magazine and including a reciprocable pawl having collar and yoke connection with said lever and operable thereby during rotation of said devices to feed a slide step by step toward the stop operating connections, and devices operable in response to operation of the stopping means to rotate the feed devices reversely relative to the magazine into relation with successively set slides.

2. In a motor driven calculating machine having a product register, cyclic differential actuators therefor, and full cycle stopping means for said actuators; means for controlling multi-cycle operation of the differential actuators, including multiplier keys, a rotary magazine, power means operable in response to manipulation of said keys to rotate the magazine, spring urged slides mounted in said magazine and having shoulders engageable with and normally spaced from the key stems by graduated intervals, detents normally serving to hold said slides against the urgency of their springs and releasable by said keys, escapement means operable by the keys to permit stepwise rotation of the magazine to bring successive unset slides into register with the key stems, connections engageable by the slides to operate the stopping means, a reciprocable lever driven in time with the differential actuators, devices rotatable with the magazine and including a reciprocable pawl having collar and yoke connection with said lever and operable thereby during rotation of said devices to feed a slide step by step toward the stop operating connections, and devices operable in response to operation of the stopping means to rotate the feed devices reversely relative to the magazine into relation with successively set slides.

3. In a motor driven calculating machine having a product register, cyclic differential actuators therefor, and full cycle stopping means for said actuators; means for controlling multi-cycle operation of the differential actuators, including multiplier keys, a rotary magazine, power means operable in response to manipulation of said keys to rotate the magazine, slides mounted in said magazine and differentially settable by said keys, escapement means operable by the keys to permit stepwise rotation of the magazine to bring successive unset slides into setting position, a reciprocable lever driven in time with the differential actuators, devices rotatable with the magazine and including a reciprocable pawl having collar and yoke connection with said lever and operable thereby during rotation of said devices to feed a slide step by step toward and beyond its normal unset position, connections engageable by a slide in the movement thereof beyond normal position to operate the stopping means, and devices operable in response to operation of the stopping means to rotate the feed devices reversely relative to the magazine into relation with successively set slides.

4. In a motor driven calculating machine having a product register, cyclic differential actuators therefor, and full cycle stopping means for said actuators; means for controlling multi-cycle operation of the differential actuators, including multiplier keys, a rotary magazine, power means operable in response to manipulation of said keys to rotate the magazine, slides mounted in said magazine and differentially settable by said keys, escapement means operable by the keys to permit stepwise rotation of the magazine to bring successive unset slides into setting position, connections engageable by the slides to operate the stopping means, a reciprocable lever driven in time with the differential actuators, devices rotatable with the magazine and including a reciprocable pawl having collar and yoke connection with said lever and operable thereby during rotation of said devices to feed a slide step by step toward the stop operating connections, devices operable in response to operation of the stopping means to rotate the feed devices reversely relative to the magazine into relation with successively set slides and means responding to rotation of the feed devices with the magazine to lock the multiplied keys against movement when the storage capacity of the magazine is exhausted.

5. In a motor driven calculating machine having a product register, cyclic differential actuators therefor, and full cycle stopping means for said actuators; means for controlling multi-cycle operation of the differential actuators, including multiplier keys, a rotary magazine, power means operable in response to manipulation of said keys to rotate the magazine, slides mounted in said magazine and differentially settable by said keys, escapement means operable by the keys to permit stepwise rotation of the magazine to bring successive unset slides into setting position, connections engageable by the slides to operate the stopping means, a reciprocable lever driven in time with the differential actuators, devices rotatable with the magazine and including a reciprocable pawl having collar and yoke connection with said lever and operable thereby during rotation of said devices to feed a slide step by step toward the stop operating connections, devices operable in response to operation of the stopping means to rotate the feed devices reversely relative to the magazine into relation with successively set slides, and means responding to rotation of the feed devices with the magazine to lock the multiplier keys and magazine against movement when the storage capacity of the magazine is exhausted, said locking means being operable to release the key and permit rotation of the magazine upon reverse rotation of the feed devices.

6. In a motor driven calculating machine having a shiftable carriage, a product register mounted therein, differential actuators for said register, and carriage shifting means; cyclic drive means common to said actuators and said shifting means, full cycle stopping means for the drive means, means for controlling operation of the drive means, including multiplier keys, a rotary magazine, slides mounted in and equidistantly spaced about the periphery of said magazine in an endless series and differentially settable by said keys, means operable in response to manipulation of said keys to rotate the magazine to bring the slides successively into setting relation with the keys, connections engageable by the slides to operate the stopping means, means operable to effect the engagement of said connections by the slides including a pawl rotatably carried with the magazine and reciprocable in time with the cyclic drive means to restore the slides from set position, means for reversely rotating said pawl relatively to the magazine in response to operation of the stopping means, program devices mounted exteriorly of the magazine and settable to control registering action of the actuators or alternative operation of the carriage shifting means by said drive means, means operable in time with the full cycle stopping means to set the program devices and thereby change the nature of the operation, and means coordinated with the rotary positioning of the pawl and with the operation of the stopping means to initiate, reinitiate, and finally stop operation of the driving means.

7. A motor driven calculating machine according to claim 6, wherein the drive means is reversely operable, and wherein the program devices include elements manually settable to provide for forward or alternatively for reverse operations of said drive means in response to the action of the initiating means.

8. In a motor driven calculating machine having a shiftable carriage, a product register mounted therein, differential actuators for said register, and carriage shifting means; cyclic drive means common to said actuators and said shifting means, full cycle stopping means for the drive means, means for controlling operation of the drive means, including multiplier keys, a rotary magazine, slides mounted in and equidistantly spaced about the periphery of said magazine in an endless series and differentially settable from normal position by said keys, means operable in response to manipulation of said keys to rotate the magazine to bring the slides successively into setting relation with the keys, connections engageable by the slides upon return thereof beyond normal position to operate the stopping means, means operable to effect the engagement of said connections by the slides including a pawl rotatably carried with the magazine and reciprocable in time with the cyclic drive means to return a slide step by step toward and beyond normal position, means for reversely rotating said pawl relatively to the magazine in response to operation of the stopping means, program devices mounted exteriorly of the magazine and settable to control registering action of the actuators and thereafter operation of the carriage shifting means in sequence by said drive means, means operable in time with the full cycle stopping means to set the program devices and thereby change the nature of the operation, and means coordinated with the rotary positioning of the pawl and with the operation of the stopping means to initiate, reinitiate, and finally stop operation of the driving means.

9. In a motor driven calculating machine having a shiftable carriage, a product register mounted therein, differential actuators for said register, and carriage shifting means; cyclic drive means common to said actuators and said shifting means, full cycle stopping means for the drive means, means for controlling operation of the drive means, including multiplier keys, a rotary magazine, devices operable by the keys to rotate the magazine, slides mounted in and equidistantly spaced about the periphery of said magazine in an endless series and differentially settable one by one by said keys, connections engageable by the slides to operate the stopping means, devices rotatable with the magazine and operable in time with the differential actuators to feed a slide step by step toward the stop operating connections, program devices mounted exteriorly of the magazine and settable to control registering action of the actuators and thereafter operation of the carriage shifting means, and normally restrained means releasable by the program devices and responding to operation of the full cycle stopping means to rotate the feed devices reversely relative to the magazine into relation with successively set slides.

10. In a motor driven calculating machine having a shiftable carriage, a product register mounted therein, differential actuators for said register, and carriage shifting means; cyclic drive means common to said actuators and said shifting means, full cycle stopping means for the drive means, means for initiating and controlling multi-cycle operation of the drive means, including multiplier keys, a rotary magazine, slides mounted in said magazine and differentially settable by said keys, means operable in response to manipulation of said keys to rotate the magazine to bring the slides successively into setting relation with the keys, a pawl driven in time with the cyclic drive means to restore the slides from set position, connections engageable by the slides upon restoration to operate the stopping means, and means for reversely rotating said pawl relatively to the magazine in response to operation of the stopping means, program devices including a plate successively settable by the full cycle stopping means to control registering action of the actuators and thereafter operation of the carriage shifting means, and a plate settable with the first named plate and cooperating with the pawl to effect a single cycle of shift, a zero key, and devices mounted in said magazine and including a displaceable element rotatable in time with the slide restoring pawl and having connection with said plates, and an element settable by the zero key into the path of movement of said displaceable element to displace the same and thereby reset the program devices to effect a carriage shift in place of a registration and to eliminate the succeeding single cycle shift.

11. In a motor driven calculating machine having a shiftable carriage, a product register mounted therein, differential actuators for said register, and carriage shifting means; cyclic drive means common to said actuators and said shifting means, full cycle stopping means for the drive means, means for initiating and controlling multi-cycle operation of the drive means, including multiplier keys, a rotary magazine, slides mounted in said magazine and differentially settable by said keys, means operable in response to manipulation of said keys to rotate the magazine to bring the slides successively into setting relation with the keys, a pawl driven in time with the cyclic drive means to restore a slide step by step toward and beyond its normal unset position, connections engageable by the slides upon restoration to operate the stopping means, and means for reversely rotating said pawl relatively to the magazine in response to operation of the stopping means, program devices including a plate successively settable by the full cycle stopping means to control registering action of the actuators and thereafter operation of the carriage shifting means, and a blocking plate settable with the first-named plate and acting to prevent reverse rotation of the pawl after a registering operation, a zero key, and devices mounted in said magazine and including a displaceable element rotatable in time with the slide restoring pawl and having connection with said plates, and an element settable by the zero key into the path of movement of said displaceable element to displace the same and thereby reset the program devices to effect a carriage shift in place of a registration and to disable the blocking plate.

12. In a motor driven calculating machine having a shiftable carriage, a product register mounted therein, differential actuators for said register, and carriage shifting means; cyclic drive means common to said actuators and said shifting means, full cycle stopping means for the drive means, means for initiating and controlling multi-cycle operation of the drive means, including differentially settable duration control elements operable in time with the cyclic drive means, and connections engageable by the operated duration control elements to operate the stopping means, program devices including a plate successively settable to control registering action of the actuators and thereafter operation of the carriage shifting means in sequence, a plate settable with the first-named plate and cooperating with the duration control elements to effect a single cycle of shift, tappet connections operable by the full cycle stopping means to set said plates, a zero key, and means settable by the zero key and operable in conjunction with the duration control elements to adjust the program plates to a position providing for operation of the carriage shift means in place of a registration and to eliminate the succeeding single cycle shift, said settable means being further operable to disable the plate setting tappet connections.

13. In a motor driven calculating machine having a shiftable carriage, a product register mounted therein, differential actuators for said register, and carriage shifting means; cyclic drive means common to said actuators and said shifting means, full cycle stopping means for the drive means, transmission devices adjustable to connect the register or alternatively the shifting means with said drive means, means for controlling multi-cycle operation of the drive means, including multiplier keys, duration control elements differentially settable by said keys, connections engageable by the duration control elements to operate the stopping means, and devices operable in time with the drive means to feed the duration control elements step by step toward the stop operating connections, a zero key, and devices settable by the zero key and operable in conjunction with a depressed multiplier key and the duration control elements settable thereby to adjust the transmission devices and thereby disable effective operation of the differential actuators and enable operation of the carriage shifting means by the drive means.

14. In a motor driven calculating machine having a shiftable carriage, a product register mounted therein, differential actuators for said register, and carriage shifting means; reversible drive means common to said actuators and said shifting means, full cycle stopping means for the drive means, transmission devices adjustable to connect the register or alternatively the shifting means with said drive means, means for controlling multi-cycle operation of the drive means, including multiplier keys, duration control elements differentially settable by said keys, connections engageable by the duration control elements to operate the stopping means, and devices operable in time with the drive means to feed the duration control elements step by step toward the stop operating connections, zero keys, devices settable by the zero keys and operable in conjunction with a depressed multiplier key and the duration control elements settable thereby to adjust the transmission devices and thereby disable effective operation of the differential actuators and enable operation of the carriage shifting means by the drive means, and means settable to provide for forward or alternatively for reverse operation of the drive means.

15. In a motor driven calculating machine having a shiftable carriage, a product register mounted therein, differential actuators for said register, and carriage shifting means; reversible drive means common to said actuators and said shifting means, full cycle stopping means for the drive means, means settable to provide for forward or alternatively for reverse operation of the drive means, transmission devices adjustable to connect the register or alternatively the shifting means with said drive means, means for controlling multi-cycle operation of the drive means, including multiplier keys, duration control elements differentially settable by said keys, connections engageable by the duration control elements to operate the stopping means, and devices operable in time with the drive means to feed the duration control elements step by step toward the stop operating connections, a carriage return key, devices settable by the carriage return key and operable in conjunction with the duration control elements to adjust the transmission devices and thereby disable effective operation of the differential actuators and enable operation of the carriage shifting means by the drive means, the carriage return key being further operable to set the drive reverse means.

EDWIN F. BRITTEN, Jr.

REFERENCES CITED

The following references are of record in the file of this patent:

UNITED STATES PATENTS

| Number | Name | Date |
|---|---|---|
| 1,409,575 | Rechnitzer | Mar. 14, 1922 |
| 2,216,659 | Avery | Oct. 1, 1940 |
| 2,376,997 | Friden et al. | May 29, 1945 |
| 2,379,877 | Britten, Jr. | July 10, 1945 |
| 2,419,760 | Britten, Jr. | Apr. 29, 1947 |

FOREIGN PATENTS

| Number | Country | Date |
|---|---|---|
| 156,715 | Great Britain | Jan. 7, 1921 |
| 580,027 | Germany | July 11, 1932 |